(12) United States Patent
Czimmek et al.

(10) Patent No.: US 11,316,373 B2
(45) Date of Patent: Apr. 26, 2022

(54) REACTIVE POWER REGULATION OF WIRELESS POWER TRANSFER NETWORK

(71) Applicant: Vitesco Technologies USA, LLC, Auburn Hills, MI (US)

(72) Inventors: Perry Robert Czimmek, Williamsburg, VA (US); Douglas Edward Cosby, Newport News, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 106 days.

(21) Appl. No.: 16/691,809

(22) Filed: Nov. 22, 2019

(65) Prior Publication Data

US 2021/0159732 A1   May 27, 2021

(51) Int. Cl.
| | |
|---|---|
| *H02J 50/12* | (2016.01) |
| *H02M 7/219* | (2006.01) |
| *B60L 53/22* | (2019.01) |
| *B60L 53/122* | (2019.01) |

(52) U.S. Cl.
CPC ............ *H02J 50/12* (2016.02); *B60L 53/122* (2019.02); *B60L 53/22* (2019.02); *H02M 7/219* (2013.01); *B60L 2210/30* (2013.01)

(58) Field of Classification Search
CPC ...... H02J 50/12; H02J 2310/48; H02M 7/219; H02M 3/01; H02M 3/33571; H02M 1/0025; H02M 3/33573; H02M 5/2932; B60L 53/122; B60L 53/22; B60L 2210/30; B60L 2210/40; Y02T 90/14; Y02T 10/7072; Y02T 10/70
USPC ......................................................... 307/104
See application file for complete search history.

(56) References Cited

U.S. PATENT DOCUMENTS

| | | | |
|---|---|---|---|
| 2015/0061577 A1* | 3/2015 | Ye ........................... | H02J 50/12 320/108 |
| 2017/0187243 A1* | 6/2017 | Sugiyama ............. | B60L 53/122 |
| 2018/0219419 A1* | 8/2018 | Ettes .................... | H02M 3/3376 |

* cited by examiner

*Primary Examiner* — Toan T Vu

(57) ABSTRACT

A wireless power transmission method of control where an electrical parameter of a resonant circuit, which is part of a transmitter antenna tuning and coupling unit, determines in some part the regulation current level target or power level target of the resonant circuit. By using an electrical parameter of a resonant circuit to establish a current or power regulation level of the resonant circuit, a maximum limitation is established for the electrical current and voltage of the antenna tuning and coupling unit in order to operate the electrical elements within safe design limits. Additionally, energy is managed entering the transmitter antenna tuning and coupling unit for variable load at the receiver.

16 Claims, 9 Drawing Sheets

REACTIVE POWER REGULATION OF WIRELESS POWER TRANSFER NETWORK

FIELD OF THE INVENTION

The present invention relates generally to automotive electrification, electric vehicles, the transfer of electrical power to vehicles, and wireless power transfer.

BACKGROUND OF THE INVENTION

The inevitable conversion of mobility from internal combustion engine propulsion to electric motor propulsion provides an environment of growing need for enabling technologies for this conversion. Vehicle weights, driving habits, and consumer expectations bound the need such that the electric vehicles mimic the performance and convenience of existing internal combustion engine propelled vehicles. This boundary requires that the energy contained within the vehicle is able to satisfy the need. In the case of the internal combustion engine, this is usually in the form of some element of fuel storage or fuel tank. The analog of the fuel tank for the electric vehicle would be in any number of electrical energy storage schemes, including but not limited to elements such as batteries, capacitors or kinetic energy storage fly-wheels.

The convenience of available fuels and fuel transfer infrastructure to resupply the vehicle fuel tank with energy has allowed for the internal combustion engine to be the dominant propulsion mode for decades throughout the world. In order to support the conversion of mobility, electrified vehicles would need their energy storage elements replenished by a convenient and widespread method. One method may be the mechanical connection of electrical conduits, such as buss, wire or cable to the vehicle for electrical energy transfer from the power grid. This would require some kind of connector mechanism that has low electrical resistance to minimize Ohmic heating and power loss. The connection would have to be maintained over a useful lifetime spanning years. Tribological wear of the electrical connection, as well as electrical arcing, galvanic oxidation, general fatigue, and repetitive handling will inevitably degrade this mechanical connection of electrical conduits. Another method may be the contactless transfer of electrical energy via electromagnetic fields, eliminating the aforementioned degradation. As there is no direct mechanical connection, this is often termed "Wireless" Power Transfer (WPT). Unlike the mechanical connection, which can transfer electrical energy as a direct current or a low frequency alternating current, WPT by convention is accomplished with a high frequency alternating current. As it is known that a time varying field will induce energy from a transmitter to a receiver over empty space. The high frequency also has the advantage that the transfer of energy can be obtained with a relatively small antenna over great distance, as is done with radio.

The generation and wireless transmission of the high frequency energy from readily available municipal or "grid" alternating current frequency sources, and at high enough power levels to transfer energy into the electric vehicle energy storage element in a convenient amount of time, creates a further need for methods and technology that can accomplish this.

SUMMARY

It is an object of the invention to fulfill the need referred to above. In accordance with example embodiments, a method is disclosed for regulating the reactive power of a resonant wireless power transfer circuit in order to actively limit the voltage and current of circuit elements within safe limits of the element design ratings with varying receiver loading. An electrical parameter of the resonant circuit is taken as a ratio to an input electrical parameter of the resonant circuit. The electrical parameters may be a voltage, a current, a phase, or combination thereof. This ratio is utilized as a scalar value to determine a current regulation target or power regulation target value of the resonant circuit.

The ratio in one embodiment may be the quotient of an electrical parameter of the resonant circuit and an input electrical parameter of the resonant circuit. The electrical parameter of the resonant circuit divided by an input electrical parameter of the resonant circuit provides a value representing the ratio as a quotient. In one embodiment, as this value increases, the current regulation level of the resonant circuit decreases, and as this value decreases, the current regulation level of the resonant circuit increases. The functional result of this is that the reactive power in the resonant circuit of the transmitter is limited to some maximum when no receiver load is present. By providing this limitation, the maximum voltage and current of the resonant circuit is ideally maintained within the limitations of the component ratings of the components comprising the resonant circuit of the transmitter antenna tuning and coupling unit. Additionally, a current or power limit may be maintained with variable receiver loads, from high load and close proximity coupling of receiver, to low load and distant proximity coupling of receiver.

According to an example embodiment, there is disclosed a wireless power transfer system, including a resonant circuit comprising a resonant component and an inductor. A receiver includes an inductor which forms inductive coupling with the inductor of the resonant circuit and a rectifier connected to the inductor of the receiver, the receiver rectifying an AC signal to generate a DC output voltage. An inverter has a first input coupled to a power source and a second input for receiving one or more control signals. The inverter includes switching circuitry coupled to the first and second inputs for selectively connecting the power source to the resonant circuit. A controller receives a first signal corresponding to an electrical parameter of the resonant component and a second signal corresponding to the electrical parameter of an input to the resonant circuit. The controller generates the one or more control signals based upon the first signal and the second signal. The one or more control signals controls the switching circuitry and sets a current regulation target for the resonant circuit that is based upon a ratio of the first signal to the second signal.

The electrical parameter of the resonant component may be a voltage across the resonant component, and the electrical parameter of the input of the resonant circuit may be a voltage across the resonant circuit.

In an example embodiment, the controller includes a first comparator which modulates the second signal to output a modulated second signal, and an amplifier configured to integrate a difference between the first signal and the modulated second signal to generate at an output of the amplifier an error signal. The current regulation target is based upon the error signal. The controller may further include a second comparator which modulates the error signal to generate a modulated error signal. The current regulation target may be based upon the modulated error signal.

The controller may further include a filter which filters the modulated error signal and generates at an output a filtered modulated error signal. The filtered modulated error signal corresponds to the ratio of the first signal to the second signal.

The controller controls the switching circuitry so that current in the resonant circuit flows in an alternating manner between positive and negative half cycles. When current in the resonant circuit reaches the current regulation target in a particular half cycle of the positive and negative half cycles, the switching circuitry is controlled to electrically isolate the resonant circuit from the power source during the particular half cycle, thereby withholding energy from the resonant circuit during the particular half cycle.

The resonant component may be a first capacitor connected to the inductor of the resonant circuit; and the switching circuitry may include a first switch connected between a first terminal of the power source and the first capacitor, a second switch connected between a second terminal of the power source and the inductor of the resonant circuit, a third switch having a first conduction terminal connected to the first capacitor and the first switch and a second conduction terminal, and a fourth switch having a first conduction terminal connected to the second conduction terminal of the third transistor and a second conduction terminal coupled to the inductor of the resonant circuit and connected to the second switch.

The resonant component may be a first capacitor connected to the inductor of the resonant circuit; and the switching circuitry may alternatively include a first switch connected between a first terminal of the power source and the first capacitor, a second switch connected between the first terminal of the power source and the inductor of the resonant circuit, a third switch having a first conduction terminal connected to the first capacitor and the first switch and a second conduction terminal connected to a second terminal of the power source, and a fourth switch having a first conduction terminal connected to the second conduction terminal of the third transistor and a second conduction terminal coupled to the inductor of the resonant circuit and connected to the second switch.

The resonant component may be a first capacitor connected to the inductor of the resonant circuit; and the switching circuitry alternatively includes a first switch connected between a first terminal of the power source and the first capacitor, and a third switch having a first conduction terminal connected to the first capacitor and the first switch and a second conduction terminal connected to a second terminal of the power source and coupled to the inductor of the resonant circuit.

According to another example embodiment, a wireless power transfer includes a resonant circuit including a resonant component and an inductor. A receiver includes an inductor which forms inductive coupling with the inductor of the resonant circuit and a rectifier connected to the inductor of the receiver. The receiver generates a DC output voltage. An inverter has a first input coupled to a power source and a second input for receiving one or more control signals. The inverter includes switching circuitry coupled to the first and second inputs for selectively connecting the power source to the resonant circuit. A controller receives a first signal corresponding to an electrical parameter of the resonant component and a second signal corresponding to the electrical parameter of an input to the resonant circuit, generates the one or more control signals based upon the first signal and the second signal. The one or more control signals controls the switching circuitry. The controller also sets a current regulation target for the resonant circuit that is based upon a signal that is proportional to an amount of modulation of the second signal needed to make the first signal and the second signal equal to each other.

The electrical parameter of the resonant component may be a voltage across the resonant component, and the electrical parameter of the input of the resonant circuit may be a voltage across the resonant circuit.

The controller may include a first comparator which modulates the second signal to output a modulated second signal and an amplifier configured to integrate a difference between the first signal and the modulated second signal to generate at an output of the amplifier an error signal. The signal that is proportional to the amount of modulation of the second signal needed to make the first signal and the second signal equal to each other is based on the error signal.

The controller may include a second comparator which modulates the error signal to generate a modulated error signal. The signal that is proportional to the amount of modulation of the second signal needed to make the first signal and the second signal equal to each other is based on the modulated error signal.

The controller may further include a filter which filters the modulated error signal and generates at an output a filtered modulated error signal. The filtered modulated error signal comprises the signal that is proportional to the amount of modulation of the second signal needed to make the first signal and the second signal equal to each other.

The controller may control the switching circuitry so that current in the resonant circuit flows in an alternating manner between positive and negative half cycles. When current in the resonant circuit reaches the current regulation target in a particular half cycle of the positive and negative half cycles, the switching circuitry is controlled to electrically isolate the resonant circuit from the power source during the particular half cycle, thereby withholding energy from the resonant circuit during the particular half cycle.

The resonant component may be a first capacitor connected to the inductor of the resonant circuit. The switching circuitry may include a first switch connected between a first terminal of the power source and the first capacitor. A second switch is connected between a second terminal of the power source and the inductor of the resonant circuit. A third switch having a first conduction terminal is connected to the first capacitor and the first switch and a second conduction terminal. A fourth switch has a first conduction terminal connected to the second conduction terminal of the third transistor and a second conduction terminal coupled to the inductor of the resonant circuit and connected to the second switch.

The resonant component may be a first capacitor connected to the inductor of the resonant circuit; and the switching circuitry may alternatively include a first switch connected between a first terminal of the power source and the first capacitor, a second switch connected between the first terminal of the power source and the inductor of the resonant circuit, a third switch having a first conduction terminal connected to the first capacitor and the first switch and a second conduction terminal connected to a second terminal of the power source, and a fourth switch having a first conduction terminal connected to the second conduction terminal of the third transistor and a second conduction terminal coupled to the inductor of the resonant circuit and connected to the second switch.

The resonant component may be a first capacitor connected to the inductor of the resonant circuit; and the switching circuitry may alternatively include a first switch connected between a first terminal of the power source and the first capacitor, and a third switch having a first conduction terminal connected to the first capacitor and the first switch and a second conduction terminal connected to a second terminal of the power source and coupled to the inductor of the resonant circuit.

DETAILED DESCRIPTION

Figure 1A:
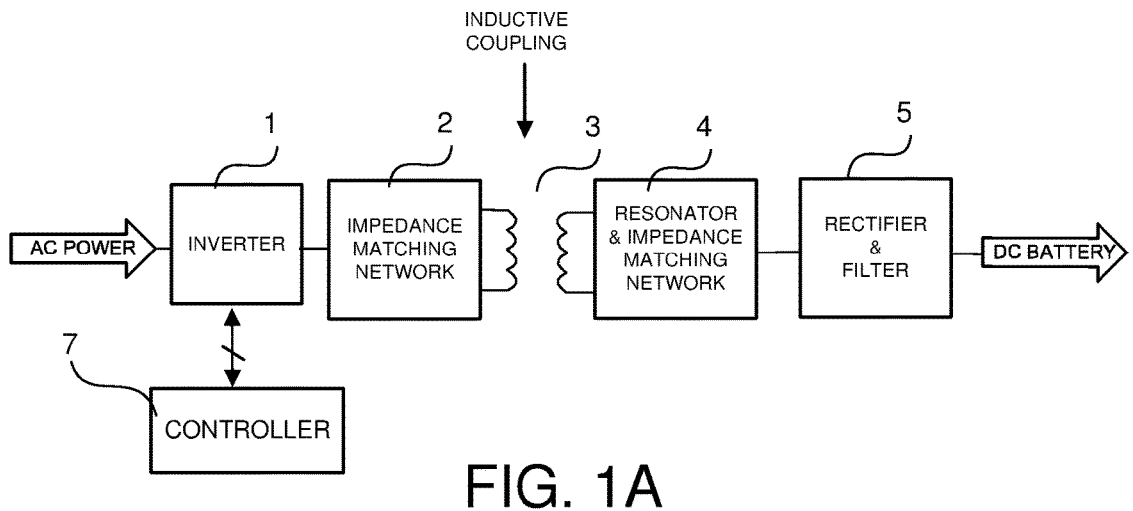
FIG. 1A is a representation of a wireless power transfer system utilizing an AC to AC scheme, according to an example embodiment.
Figure 1B:
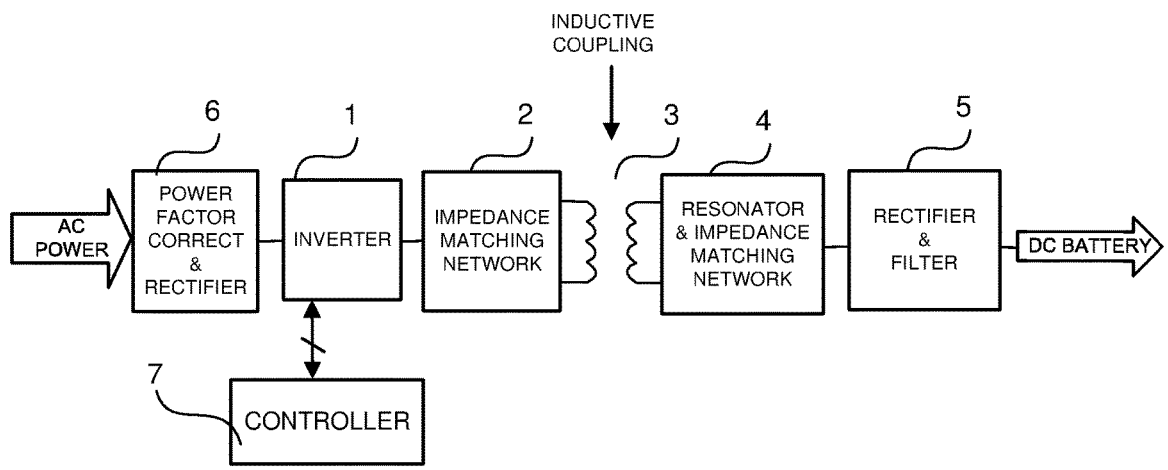
FIG. 1B is a representation of a wireless power transfer system utilizing a DC to AC scheme, according to an example embodiment.

Referring to FIG. 1a, a wireless power transfer system is disclosed that converts low frequency alternating current into high frequency alternating current (AC to AC), including an inverter 1, an impedance matching network 2, an inductive coupling 3 through free space, a receiver resonator and impedance matching network 4, and a rectifier and filter 5. A processor and/or controller 7 may generate control signals for controlling inverter 1 based at least in part upon feedback signals received therefrom, as described in greater detail below. Referring to FIG. 1b, an additional functional block for power factor correction and rectification 6 is shown, to receive low frequency alternating current and convert it to direct current as an additional step and/or function necessary for a direct current to high frequency alternating current (DC to AC) wireless power transfer system. It is understood that inverter 1, impedance matching network 2, impedance matching network 4, and rectifier and filter 5 may be implemented, in whole or in part, in hardware and/or in software executed by at least one processor or controller. The rectifier of the rectifier and filter 5 block may be implemented in any of a number of ways, including as a half-wave rectifier, a full-wave rectifier, etc. It is understood that rectifiers, rectifiers with filters, resonators and impedance matching networks are very well known such that a description for them will not be provided for reasons of simplicity. For further simplicity of presentation, referring to FIGS. 1a and 1b, resonator and impedance matching 4 as well as rectifier and filter 5 are combined into a receiver block 19 of FIGS. 2-6.

With reference to FIG. 1a, grid alternating current as an AC power is applied to an inverter 1, which by use of semiconductor switches digitally sequenced under a predetermined control, converts the grid alternating current from a low frequency, 50/60 Hz in the case of European or North American power grid or 400 Hz port/aviation power grid for example, to a high frequency alternating voltage, 85 kHz as in SAE J2954 standard or frequencies allotted in ITU Treaty and Title 47 FCC ISM (Industrial, Scientific, and Medical) or ETSI EN 303 417 standard or other high frequency greater than 10 kHz, for example.

With reference to FIG. 1b, grid alternating current as an AC power is applied to a power factor correction and rectification functionality 6, which by use of a combination of semiconductor switches, diodes and electrical components such as capacitors and inductors converts the grid alternating current from a low frequency, 50/60 Hz in the case of European or North American power grid or 400 Hz port/aviation power grid for examples, to a DC power with fixed polarity of voltage. This DC power is applied to an inverter 1, which by use of semiconductor switches digitally sequenced under a predetermined control, converts the direct current to a high frequency alternating voltage, 85 kHz as in SAE J2954 standard or frequencies allotted in ITU Treaty and Title 47 FCC ISM (Industrial, Scientific, and Medical) or ETSI EN 303 417 standard or other high frequency greater than 10 kHz, for example.

The high frequency alternating voltage is presented to a transmitter antenna tuning and coupling unit which may include an impedance matching network 2, and then inductive coupling 3. Across the inductive coupling 3, power is transferred to a receiver antenna tuning and coupling unit which may include the resonator and impedance matching network 4. The output of the receiver then may be provided to the rectifier and filter 5 that converts the high frequency alternating current into a direct current which may be used to charge a DC battery, or may be used to charge another type of energy storage element, such as capacitor or flywheel.

FIGS. 2-6 show example embodiments of inverter 1, with inductive coupling 3 that is comprised of a transmitter inductive coil 16 and a receiving inductive coil 18 with a coupling coefficient 17. The resonator and impedance matching network 4, rectifier and filter 5 FIGS. 1a and 1b), and any energy storage element (system load) are combined into a receiver block 19, for the sake of simplicity in description.

Figure 2:
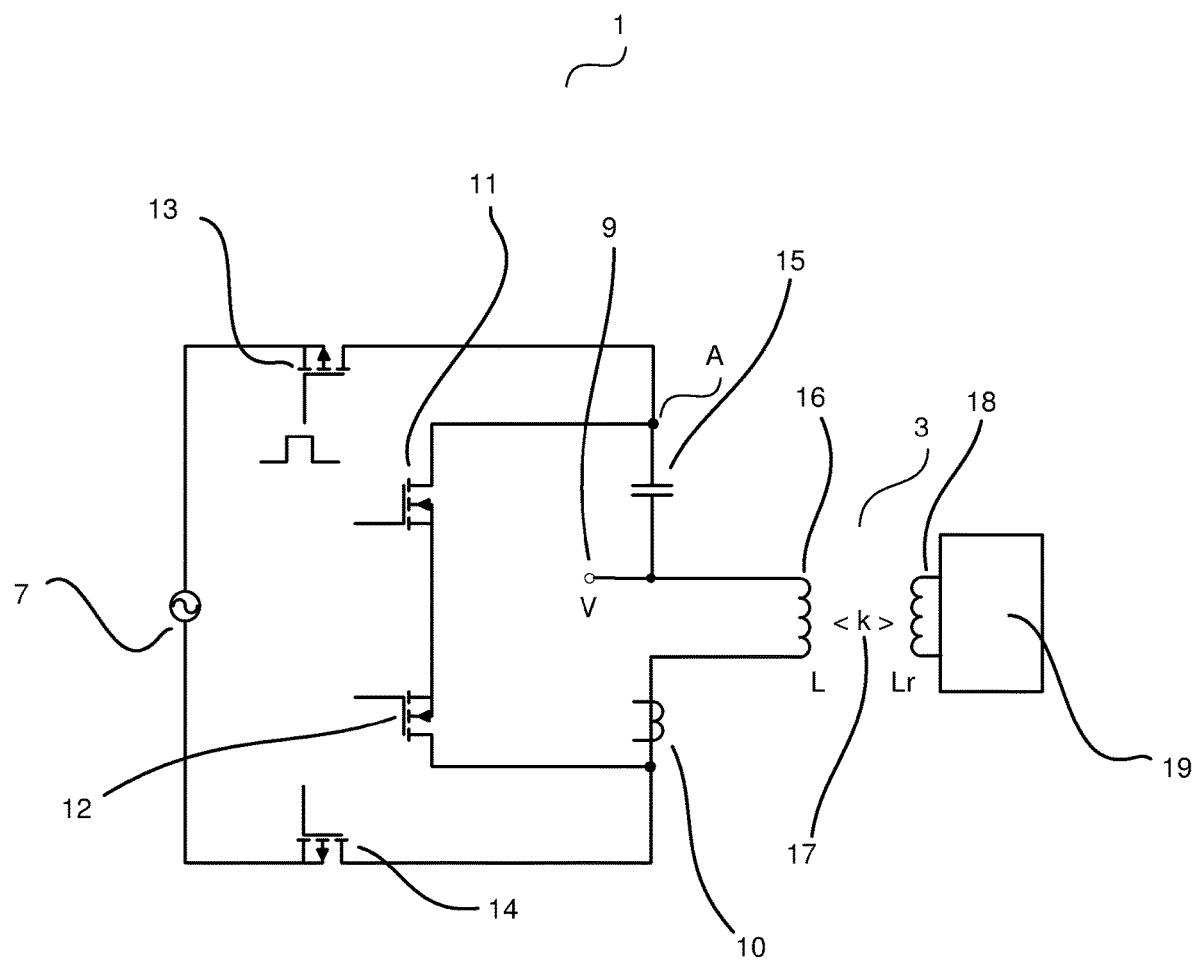
FIG. 2 is a simplified schematic of an AC to AC converter forming at least part of the wireless power transfer system of FIG. 1A, according to an example embodiment.

With reference to FIG. 2, an AC to AC inverter 1 is shown, connected to an AC source 7. Inverter 1 includes a bridge of semiconductor switches 11, 12, 13, and 14, which feed a series resonant circuit comprised of a resonator capacitor 15 and inductive coil 16 which forms part of inductive coupling 3. Switches 11 and 12 are illustrated as n-channel MOSFET transistors and switches 13 and 14 are illustrated as p-channel MOSFET transistors, but it is understood that switches 11-14 may be implemented with other types of transistors. As shown, the source terminal of switch 13 is connected to one terminal of AC source 7 and the source terminal of switch 14 is connected to the other terminal of AC source 7. The drain terminal of switch 13 is connected to the drain terminal of switch 11 and a terminal of resonant capacitor 15, and the drain terminal of switch 14 is connected to the drain terminal of switch 12 and is coupled to inductive coil 16. The control (gate) terminals of switches 11-14 receive control signals from controller 7, as described in greater detail below.

The current of the series resonant circuit flows alternately at high frequency through resonant capacitor 15, switch 11, switch 12, and inductive coil 16. In one control method by which controller 7 is configured, while clocked and switching at the high frequency, switch 13 conducts during the positive half cycle of the incoming alternating current while switch 14 does not conduct. Specifically, during the positive half cycle, when the current of the resonant circuit is positive, switches 13 and 11 are turned on; and when the current of the resonant circuit is negative, switch 13 is turned off and switches 11 and 12 are turned on. Then switch 14 conducts during the negative half cycle of alternating current while switch 13 does not conduct. Specifically, during the negative half cycle, when the current of the resonant circuit is negative, switches 12 and 14 are turned on; and when the resonant circuit current is positive, switch 14 is turned off and switches 11 and 12 are turned on. Current flowing in the resonant circuit is measured with a current transformer 10 connected between inductive coil 16 and the drain terminal of switches 12 and 14 and provided as an input to controller 7, and when the current reaches a current target value, switches 13 and 14 do not conduct (i.e., are not turned 'ON'), during their cycle to a conducting state, and switches 11 and 12 conduct (i.e. are turned "ON") which withholds energy from the resonant circuit and limits the current flowing in the resonator circuit during that cycle. The voltage between sample point 9 and node A at the drain terminal of switches 11 and 13 is the voltage across the resonant capacitor 15. In an embodiment, this voltage value may be divided by the voltage value between node A and node L at a terminal of inductive coil 16, to obtain a quotient that provides input to the current target value.

Figure 3:
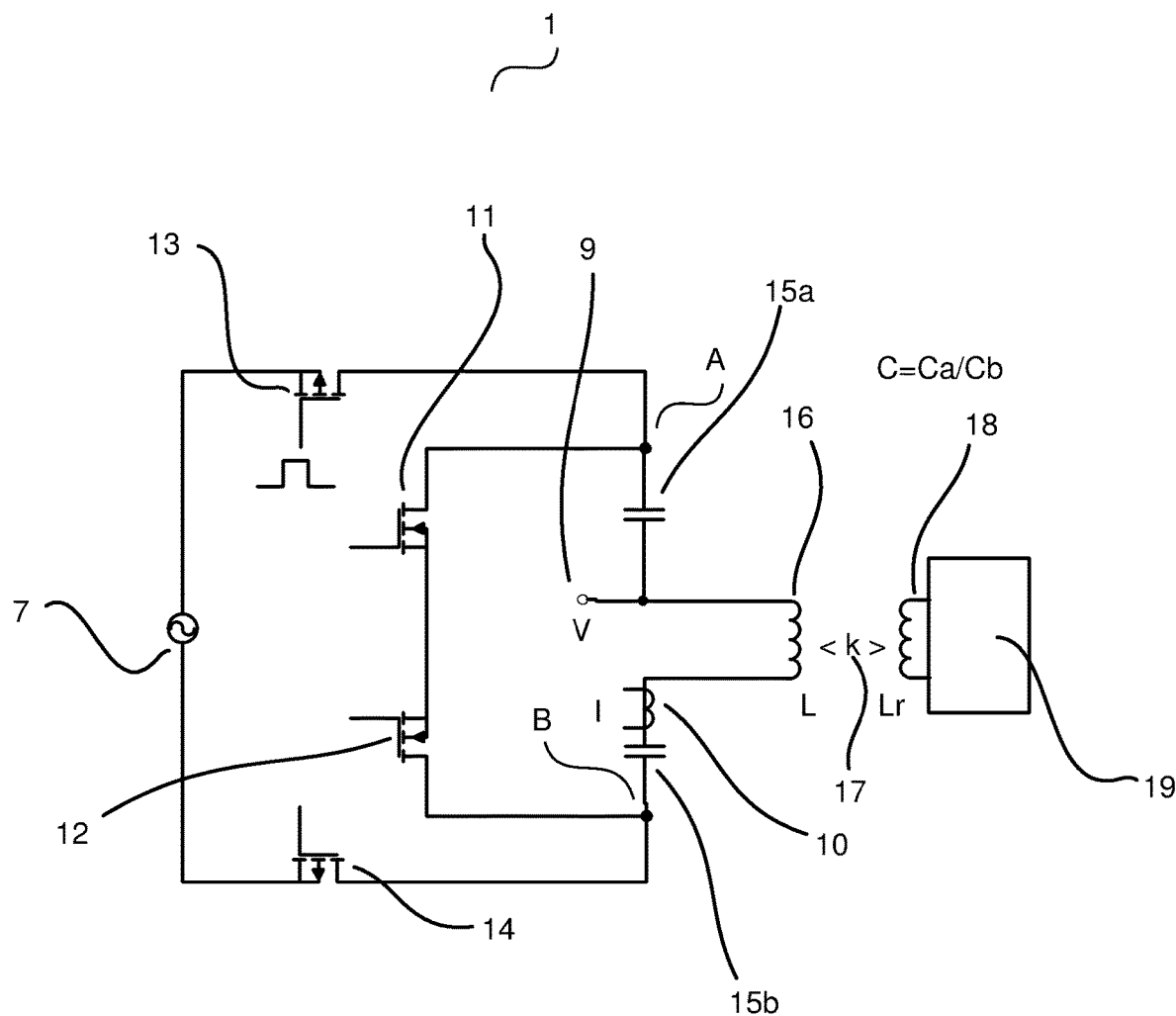
FIG. 3 is a simplified schematic of an AC to AC converter forming at least part of the wireless power transfer system of FIG. 1A, according to another example embodiment.

With reference to FIG. 3, resonant capacitor 15 is subdivided into two series capacitors 15a and 15b. As illustrated, series capacitor 15a is connected between the drain terminals of switches 13 and 11 at node A and the first terminal of inductive coil 16 at sample point 9, and series capacitor 15b is connected between the drain terminals of switches 12 and 14 at node B and the current transformer 10. The relationship between the capacitance C of resonant capacitor 15 (FIG. 2) and the capacitances of series capacitors 15a and 15b is shown by $$C = \frac{1}{\frac{1}{C_a} + \frac{1}{C_b}}$$

where C is the capacitance of resonant capacitor 15, Ca is the capacitance of series capacitor 15a and Cb is the capacitance of series capacitor 15b. If the capacitances Ca and Cb of series capacitors 15a and 15b are equal, the relationship between the capacitance C of capacitor 15 and the capacitances Ca and Cb of series capacitors 15a and 15b may be seen to be $$C = Ca/2.$$

This demonstrates that the reactive component may be a plurality of components, and this applies to resonator capacitor 15 and the corresponding inductive resonance of the inductive coil 16. In an example embodiment, inverter 1 of FIG. 3 is controlled using the same control method used by controller 7 to control inverter 1 of FIG. 2, as described above.

Figure 4:
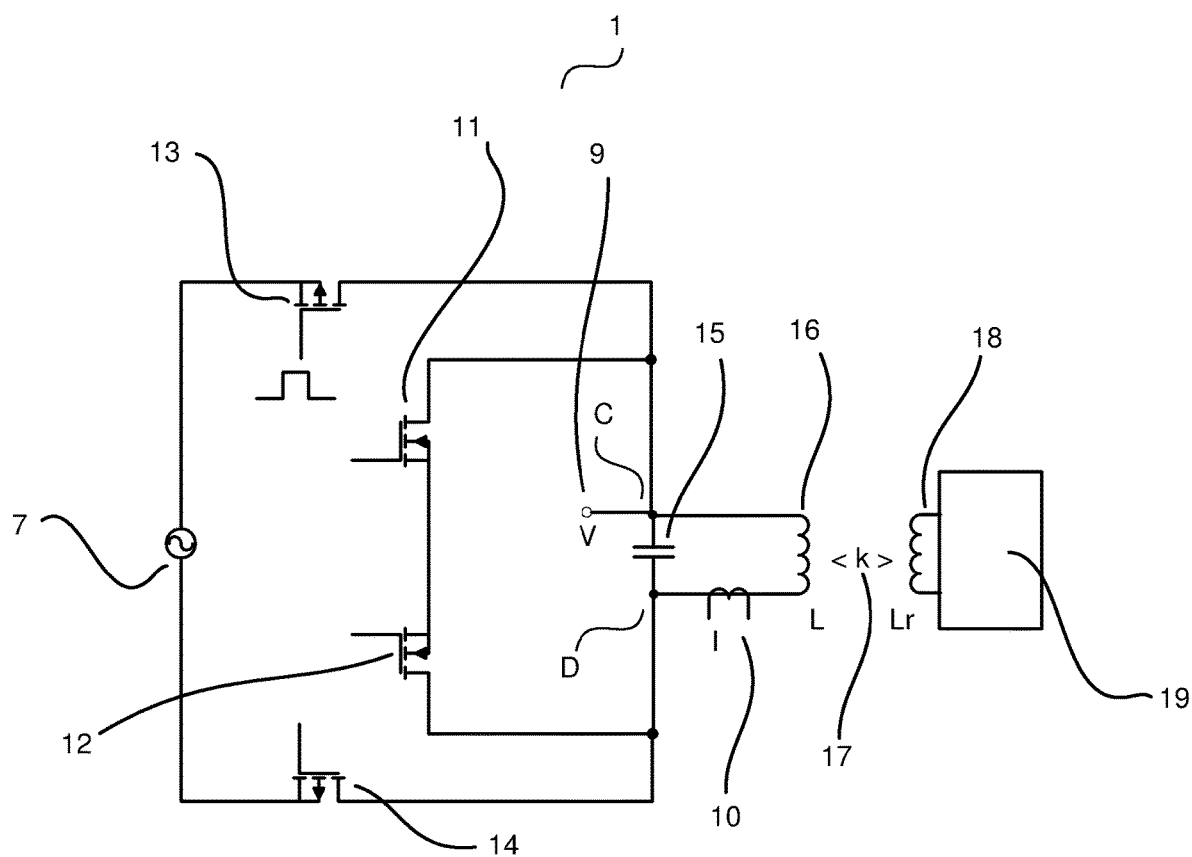
FIG. 4 is a simplified schematic of an AC to AC converter forming at least part of the wireless power transfer system of FIG. 1A, according to another example embodiment.

With reference to FIG. 4, an example AC to AC inverter 1 may be implemented with the same control as illustrated in FIG. 2 and FIG. 3, but rather than a series resonant circuit formed by resonant capacitor 15 and inductive coil 16, a parallel resonant circuit is shown with resonant capacitor 15 in parallel with inductive coil 16. Instead of the voltage parameter used in the series resonant circuit, another electrical parameter in the form of the current is used for the parallel resonant circuit. The current value from current transformer 10 may be divided by the current flowing through the node of C or node D to again obtain a quotient that provides input to a current target value. In an example embodiment, inverter 1 of FIG. 4 is controlled using the same control method used by controller 7 to control inverter 1 of FIG. 2, as described above.

Figure 5:
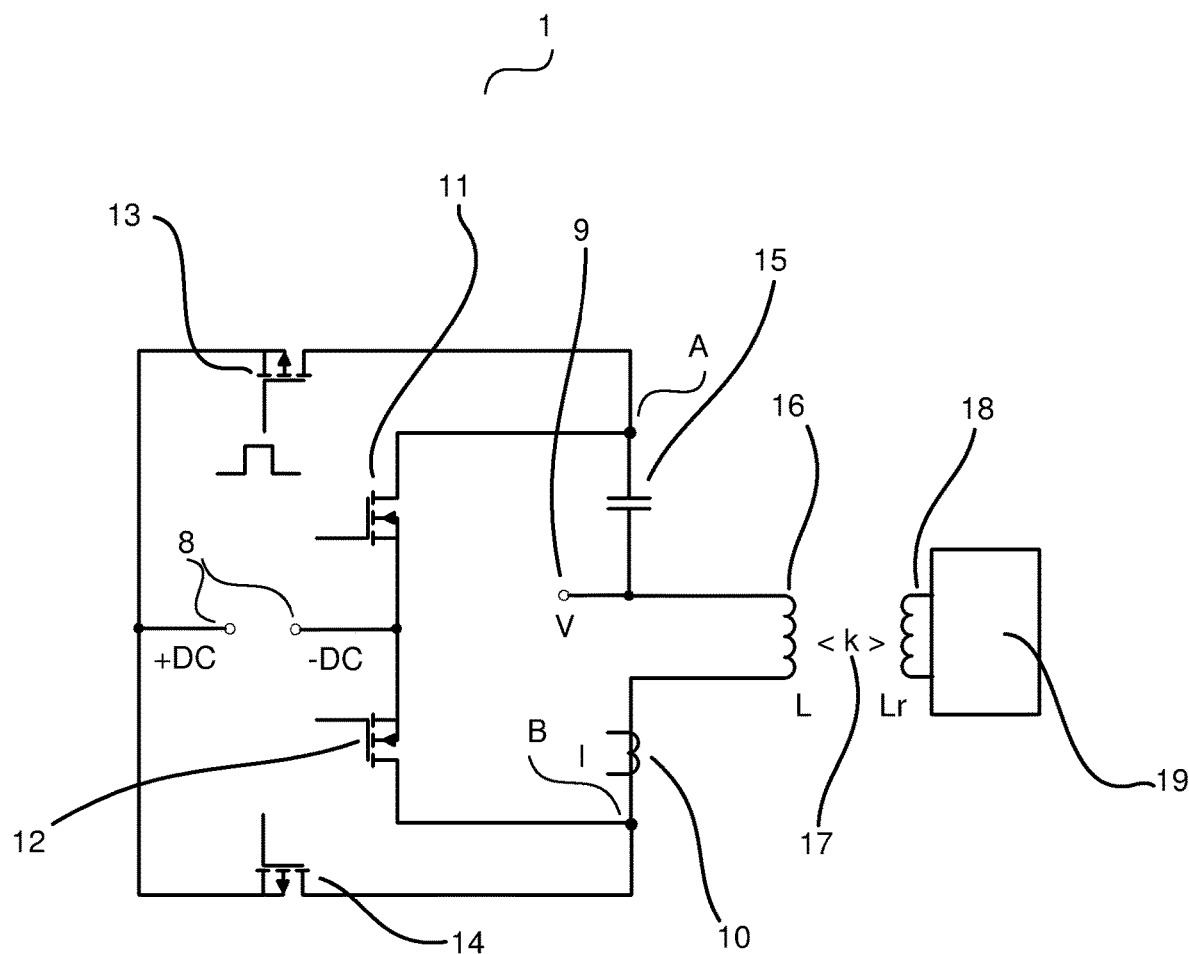
FIG. 5 is a simplified schematic of a DC to AC converter forming at least part of the wireless power transfer system of FIG. 1B, according to an example embodiment

With reference to FIG. 5, a DC to AC inverter is shown, with terminals 8 for connecting to a DC supply (not shown). The DC supply is applied to a bridge of semiconductor switches 11-14, feeding a series resonant circuit including resonant capacitor 15 and inductive coil 16. The positive terminal of the DC supply connects to the source terminals of switches 13 and 14, and the negative terminal of the DC supply connects to the source terminals of switches 11 and 12. Current of the resonant circuit flows alternately at high frequency through resonant capacitor 15, switch 11, switch 12, and inductive coil 16. In one control method by which controller 7 is configured, while clocked and switching at the high frequency, switch 13 conducts while switch 11 does not conduct. Then when conduction cycle of switch 13 ends, switch 14 conducts and switch 12 does not conduct. Thereby switch 13 conducts primarily when switch 12 conducts, and alternatively switch 14 conducts primarily when switch 11 conducts. Current flowing in the resonant circuit is measured with current transformer 10 connected between a terminal of inductive coil 16 and the drain terminals of switches 12 and 14, and when the current reaches a current target value, switch 13 and switch 14 are not turned 'ON' during their cycle in which such switches are normally turned on, which withholds energy from the resonant circuit and limits the current flowing in the resonator circuit during that particular cycle. The voltage between sample point 9 and node A is the voltage across the resonant capacitor C 15. In one embodiment, this voltage value may be divided by the voltage value between node A and node B, i.e., the voltage appearing across the series resonant circuit, to obtain a quotient that provides input to the current target value.

Figure 6:
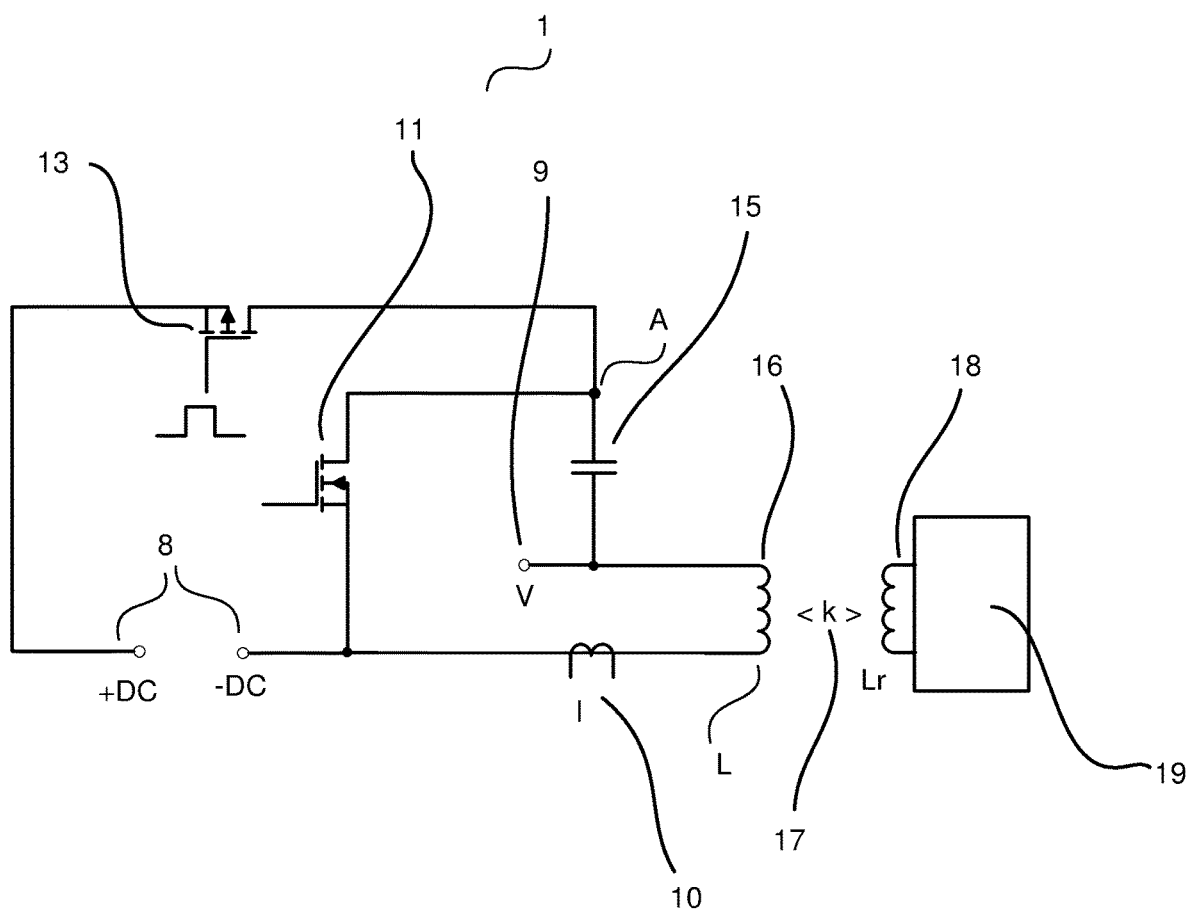
FIG. 6 is a simplified schematic of a DC to AC converter forming at least part of the wireless power transfer system of FIG. 1B, according to an example embodiment.

With reference to FIG. 6, a DC to AC inverter is shown, with connections 8 for receiving the direct current from a DC supply (not shown). A direct current is applied to a half-bridge of formed by switches 11 and 13, feeding the series resonant circuit that includes resonant capacitor 15 and inductive coil 16. As shown, switch 13 is connected between the resonant capacitor 15 and the positive terminal of the DC supply, and switch 11 is connected between the same terminal of resonant capacitor 15 and the negative terminal of the DC supply. Current in the resonant circuit current flows alternately at high frequency through resonant capacitor 15, and inductive coil 16 via switches 11 and 13. In one control strategy by which controller 7 is configured, while clocked and switching at the high frequency, switch 13 conducts while switch 11 does not. Current flowing in the resonant circuit is measured with current transformer 10 which is connected between the inductive coil 16 and the negative terminal of the DC supply, and when the current in current transformer 10 reaches a current target value, switch 13 is not turned 'ON' during the cycle, which withholds energy from the resonant circuit and limits the current flowing in the resonant circuit during that particular cycle. Voltage between sample point 9 and node A (connecting resonant capacitor 15 and switches 11 and 13) is the voltage across the resonant capacitor C 15. In one embodiment, this voltage value may be divided by the voltage value between node A and the node L, i.e., the voltage across the resonant circuit, to obtain a quotient that provides input to the current target value.

Figure 7:
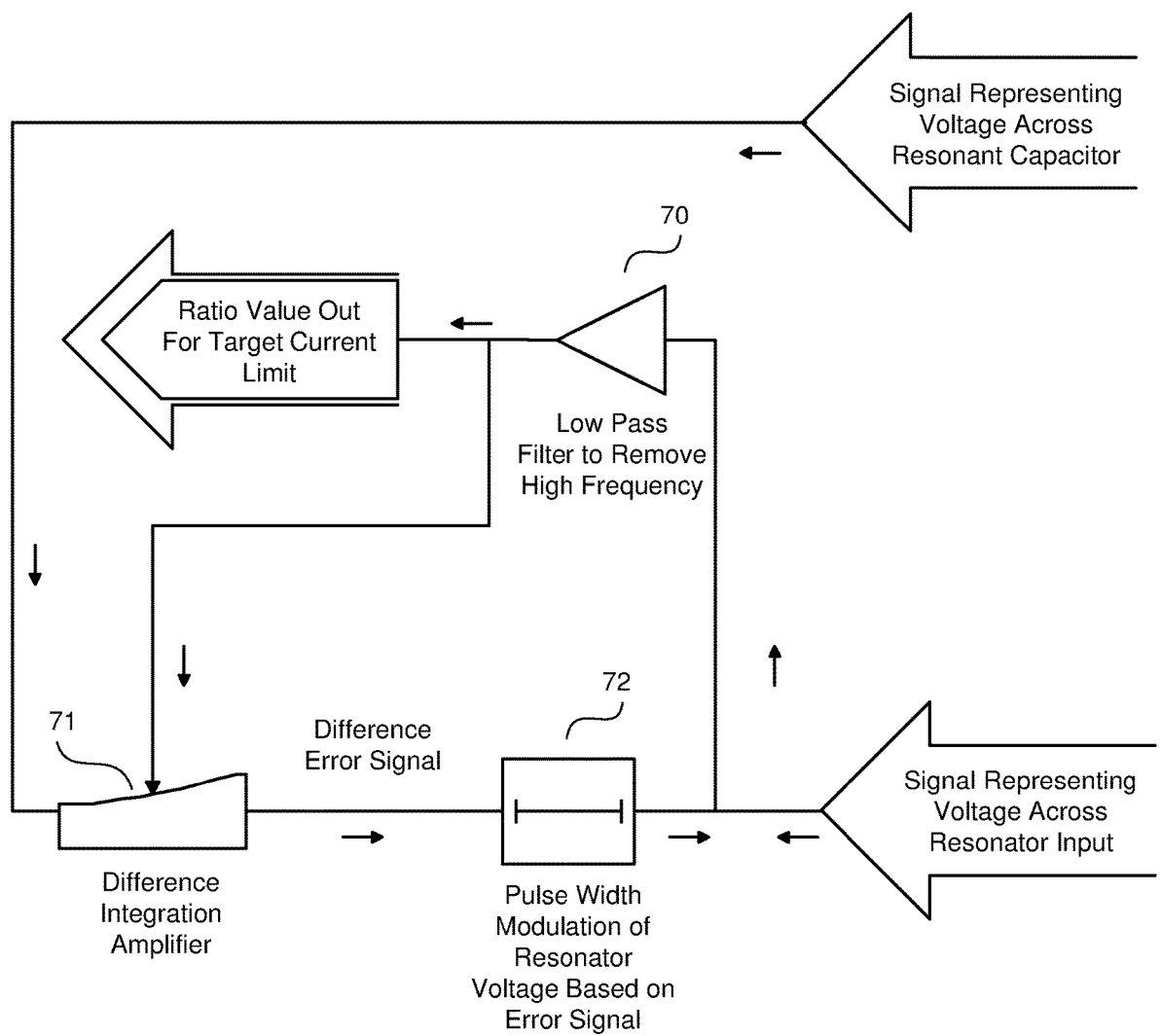
FIG. 7 is a diagram illustrating control signal generation for the wireless power transfer system of FIGS. 1A-1B, according to an example embodiment.

With reference to FIG. 7, in an embodiment for determining the above-referenced ratio, the signal representing voltage across the resonator input, i.e., at the connection of the switches 11, 13 and switches 12, 14 (switches 11 and 13 for FIG. 6) to the series resonant circuit, is modulated by modulation block 72 based on the error between the signal representing the voltage across resonant capacitor 15 and the modulated signal representing the voltage across the resonator input. The result of the modulation is to generate a signal representing the voltage across the resonator input that is equal to the signal representing the voltage across resonant capacitor 15, and the necessary modulation duty cycle is the equivalent ratio of the two voltages. The modulated signal is processed through a low pass filter 70 such that the variation of the signal due to modulation frequency is removed to present only the information of the modulation correction and not the variation of the pulse width rising and falling signal, or rather the average of the high level and low level of the pulse width modulation. The difference between the voltage across resonator capacitor 15 and the voltage across the resonator input may be integrated by an integration amplifier 71 to drive the error signal to zero. Mathematically, the product of the duty cycle and the voltage across the resonator input is equal to the voltage across resonant capacitor 15. Solving for percent duty cycle yields equivalent ratio of the voltage across resonant capacitor 15 and the voltage across the resonator input. A ratio equivalent signal is then made available as a signal representing the duty cycle necessary to drive to zero the error between the signal representing the voltage across resonant capacitor 15 and the modulated signal representing the voltage across the resonator input. In an example embodiment, FIG. 7 is implemented by or in controller 7 or if separate therefrom, provides the output, the ratio value output for the current target limit, to controller 7.

Figure 8:
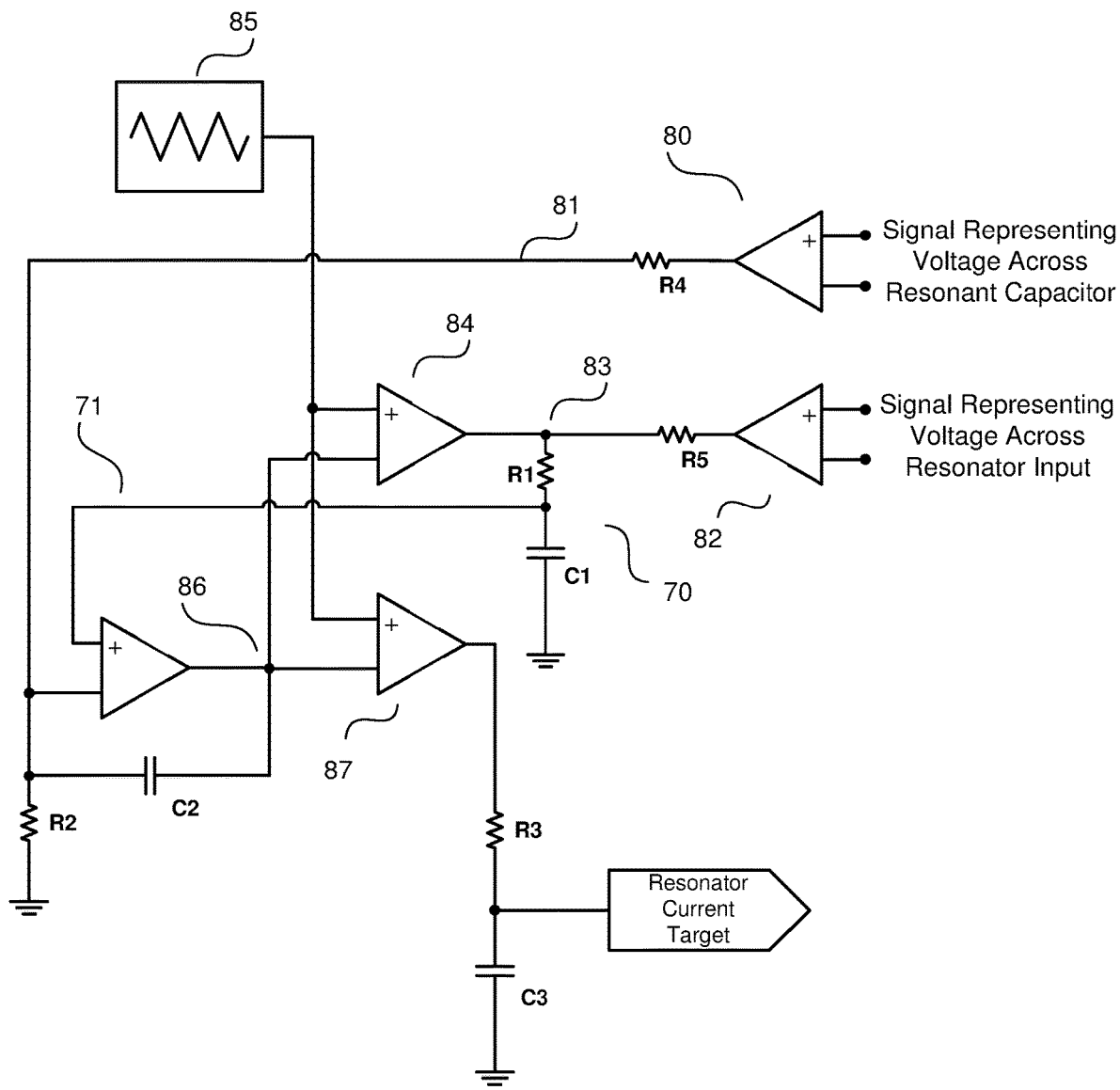
FIG. 8 is a simplified schematic of an implementation of the control signal generation of FIG. 7, according to an example embodiment.

Expanding the detail of this embodiment, with reference to FIG. 8, a differential amplifier 80 provides at its output the signal 81 representing the voltage across resonant capacitor 15. Differential amplifier 82 provides at its output the signal 83 representing the voltage across the resonator input, scaled by resistors R5 and R1 as needed. A pulse width modulation (PWM) comparator 84 modulates the signal 83 (corresponding to the output of differential amplifier 82) by an output signal from the integration amplifier 71 compared to a triangle or sawtooth waveform from signal generator 85 to generate the pulse width modulation. Resistor R1 and capacitor C1 form the low pass filter 70 that removes the variation of the high and low PWM values to yield an average voltage representing the modulated signal 83. The difference between this modulated voltage and the signal 81, scaled by resistor R2, is integrated by capacitor C2 to yield the error voltage 86 provided to the PWM comparator 84 and the output PWM comparator 87. The Output PWM comparator 87 is filtered by the low pass filter formed by resistor R3 and capacitor C3 to yield a voltage representing the ratio of the voltage across resonator capacitor 15 and the voltage across the resonator input. In an example embodiment, FIG. 8 is implemented in or by controller 7 or if separate therefrom, the implementation provides the output, the resonator current target to controller 7.

Figure 9:
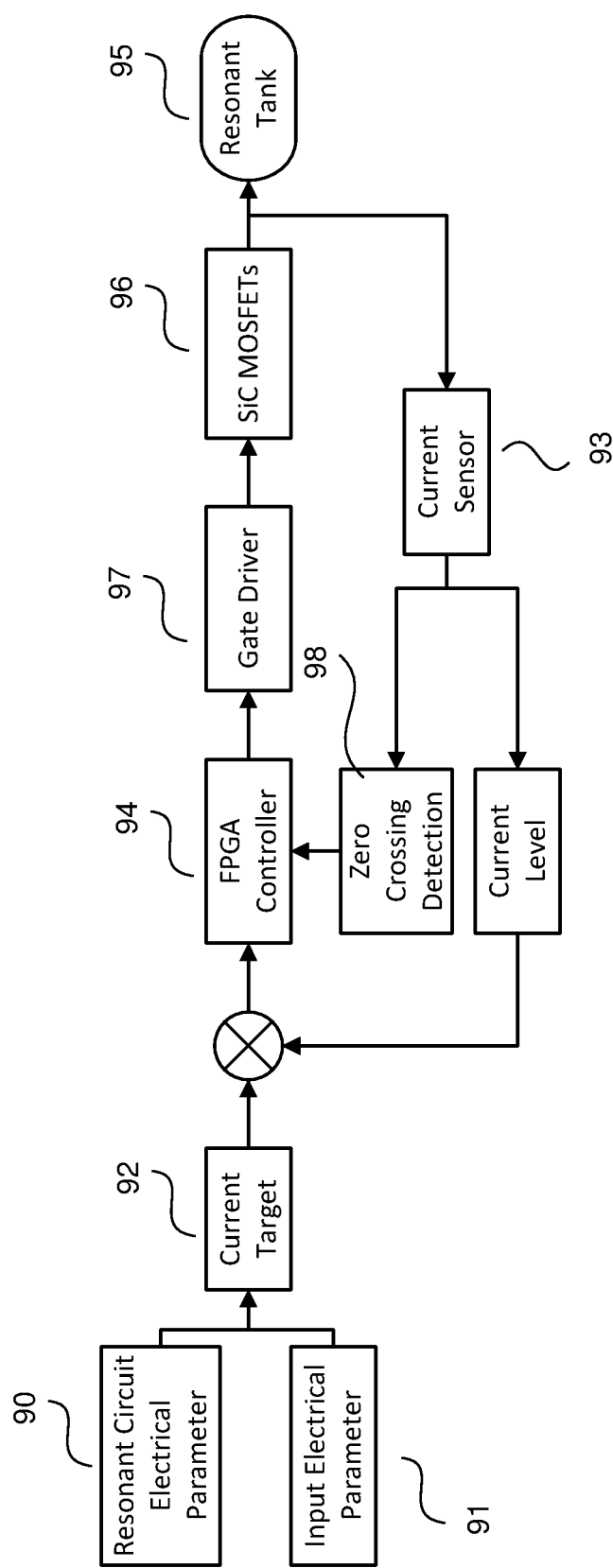
FIG. 9 is a block diagram of an implementation on an FPGA (Field Programmable Gate Array) of the wireless power transfer system of FIGS. 1A and 1B, according to an example embodiment.

With reference to FIG. 9, an embodiment block diagram of an FPGA (Field Programmable Gate Array) implementation is shown. While FIG. 7 and FIG. 8 may implement the embodiment in a hardware analog electronic or a software numerical method, FIG. 9 represents an embodiment implemented as a hardware numerical method.

With reference to FIG. 9, a resonant circuit electrical parameter 90 is divided by an input electrical parameter 91 and computations are made to generate a current target value 92. These computations may include the operations performed by the embodiments of FIG. 7 and/or FIG. 8 described above. The current target 92 is compared to a current level measured by a current sensor 93. The current sensor 93 in the embodiment is of a Hall Effect type, but a current transformer or other sensor type may be employed. If the current level in the resonant circuit 95 is above the current target 92, then the FPGA controller 94 does not enable replenishment of the energy in the resonant circuit 95, by selectively disabling conduction of silicon carbide metal oxide semiconductor field effect transistors (SiC MOSFETs) 96, which are coupled to the resonant tank circuit 95, by means of control through the gate driver 97. Additionally, for the FPGA to make the selection of which SiC MOSFET 96 to disable and enable, a zero crossing detection block 98 is also performed on the data from the current sensor 93.

It is to be understood that the type and plurality of semiconductor switches, type and plurality of reactive components, and means by which resonant component electrical parameter is obtained or measured, and means by which resonant circuit input electrical parameter is obtained or measured, should not depart from the scope and spirit of the invention. It is to be understood that the embodiments shown and described herein are only illustrative of the principles of the present invention and that various modifications may be implemented by those skilled in the art without departing from the scope and spirit of the invention.

What is claimed is:
1. A wireless power transfer system, comprising:
a resonant circuit comprising a resonant component and an inductor;
a receiver comprising an inductor which forms inductive coupling with the inductor of the resonant circuit and a rectifier connected to the inductor of the receiver, the receiver rectifying an AC signal to generate a DC output voltage;
an inverter having a first input coupled to a power source and a second input for receiving one or more control signals, the inverter comprising switching circuitry coupled to the first and second inputs for selectively connecting the power source to the resonant circuit; and
a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a ratio of the first signal to the second signal, wherein the controller includes a first comparator which modulates the second signal to output a modulated second signal, and an amplifier configured to integrate a difference between the first signal and the modulated second signal to generate at an output of the amplifier an error signal, the current regulation target being based upon the error signal.

2. The wireless power transfer system of claim 1, wherein the electrical parameter of the resonant component comprises a voltage across the resonant component, and the electrical parameter of the input of the resonant circuit comprises a voltage across the resonant circuit.

3. The wireless power transfer system of claim 1, wherein the controller further includes a second comparator which modulates the error signal to generate a modulated error signal, the current regulation target being based upon the modulated error signal.

4. The wireless power transfer system of claim 3, wherein the controller further comprises a filter which filters the modulated error signal and generates at an output a filtered modulated error signal, the filtered modulated error signal corresponding to the ratio of the first signal to the second signal.

5. The wireless power transfer system of claim 1, wherein the controller controls the switching circuitry so that current in the resonant circuit flows in an alternating manner between positive and negative half cycles, and when current in the resonant circuit reaches the current regulation target in a particular half cycle of the positive and negative half cycles, the switching circuitry is controlled to electrically isolate the resonant circuit from the power source during the particular half cycle, thereby withholding energy from the resonant circuit during the particular half cycle.

6. A wireless power transfer system comprising:
a resonant circuit comprising a resonant component and an inductor;
a receiver comprising an inductor which forms inductive coupling with the inductor of the resonant circuit and a rectifier connected to the inductor of the receiver, the receiver rectifying an AC signal to generate a DC output voltage;
an inverter having a first input coupled to a power source and a second input for receiving one or more control signals, the inverter comprising switching circuitry coupled to the first and second inputs for selectively connecting the power source to the resonant circuit; and
a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a ratio of the first signal to the second signal, wherein:
the resonant component comprises a first capacitor connected to the inductor of the resonant circuit; and
the switching circuitry comprises a first switch connected between a first terminal of the power source and the first capacitor, a second switch connected between a second terminal of the power source and the inductor of the resonant circuit, a third switch having a first conduction terminal connected to the first capacitor and the first switch and a second conduction terminal, and a fourth switch having a first conduction terminal connected to the second conduction terminal of the third switch transistor and a second conduction terminal coupled to the inductor of the resonant circuit and connected to the second switch.

7. A wireless power transfer system comprising:
a resonant circuit comprising a resonant component and an inductor;
a receiver comprising an inductor which forms inductive coupling with the inductor of the resonant circuit and a rectifier connected to the inductor of the receiver, the receiver rectifying an AC signal to generate a DC output voltage;
an inverter having a first input coupled to a power source and a second input for receiving one or more control signals, the inverter comprising switching circuitry coupled to the first and second inputs for selectively connecting the power source to the resonant circuit; and
a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a ratio of the first signal to the second signal, wherein:
the resonant component comprises a first capacitor connected to the inductor of the resonant circuit; and
the switching circuitry comprises a first switch connected between a first terminal of the power source and the first capacitor, a second switch connected between the first terminal of the power source and the inductor of the resonant circuit, a third switch having a first conduction terminal connected to the first capacitor and the first switch and a second conduction terminal connected to a second terminal of the power source, and a fourth switch having a first conduction terminal connected to the second conduction terminal of the third switch and a second conduction terminal coupled to the inductor of the resonant circuit and connected to the second switch.

8. A wireless power transfer system comprising:
a resonant circuit comprising a resonant component and an inductor;
a receiver comprising an inductor which forms inductive coupling with the inductor of the resonant circuit and a rectifier connected to the inductor of the receiver, the receiver rectifying an AC signal to generate a DC output voltage;
an inverter having a first input coupled to a power source and a second input for receiving one or more control signals, the inverter comprising switching circuitry coupled to the first and second inputs for selectively connecting the power source to the resonant circuit; and
a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a ratio of the first signal to the second signal,
wherein the resonant component comprises a first capacitor connected to the inductor of the resonant circuit; and the switching circuitry comprises a first switch connected between a first terminal of the power source and the first capacitor, and a third switch having a first conduction terminal connected to the first capacitor and the first switch and a second conduction terminal connected to a second terminal of the power source and coupled to the inductor of the resonant circuit.

9. A wireless power transfer system, comprising:
a resonant circuit comprising a resonant component and an inductor;
a receiver comprising an inductor which forms inductive coupling with the inductor of the resonant circuit and a rectifier connected to the inductor of the receiver, the receiver generating a DC output voltage;
an inverter having a first input coupled to a power source and a second input for receiving one or more control signals, the inverter comprising switching circuitry coupled to the first and second inputs for selectively connecting the power source to the resonant circuit; and
a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a signal that is proportional to an amount of modulation of the second signal needed to make the first signal and the second signal equal to each other, wherein the controller includes a first comparator which modulates the second signal to output a modulated second signal, and an amplifier configured to integrate a difference between the first signal and the modulated second signal to generate at an output of the amplifier an error signal, the signal that is proportional to the amount of modulation of the second signal needed to make the first signal and the second signal equal to each other being based on the error signal.

10. The wireless power transfer system of claim 9, wherein the electrical parameter of the resonant component comprises a voltage across the resonant component, and the electrical parameter of the input of the resonant circuit comprises a voltage across the resonant circuit.

11. The wireless power transfer system of claim 9, wherein the controller further includes a second comparator which modulates the error signal to generate a modulated error signal, the signal that is proportional to the amount of modulation of the second signal needed to make the first signal and the second signal equal to each other being based on the modulated error signal.

12. The wireless power transfer system of claim 11, wherein the controller further comprises a filter which filters the modulated error signal and generates at an output a filtered modulated error signal, the filtered modulated error signal comprising the signal that is proportional to the amount of modulation of the second signal needed to make the first signal and the second signal equal to each other.

13. The wireless power transfer system of claim 9, wherein the controller controls the switching circuitry so that current in the resonant circuit flows in an alternating manner between positive and negative half cycles, and when current in the resonant circuit reaches the current regulation target in a particular half cycle of the positive and negative half cycles, the switching circuitry is controlled to electrically isolate the resonant circuit from the power source during the particular half cycle, thereby withholding energy from the resonant circuit during the particular half cycle.

14. A wireless power transfer system, comprising:
a resonant circuit comprising a resonant component and an inductor;
a receiver comprising an inductor which forms inductive coupling with the inductor of the resonant circuit and a rectifier connected to the inductor of the receiver, the receiver generating a DC output voltage;
an inverter having a first input coupled to a power source and a second input for receiving one or more control signals, the inverter comprising switching circuitry coupled to the first and second inputs for selectively connecting the power source to the resonant circuit; and
a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a signal that is proportional to an amount of modulation of the second signal needed to make the first signal and the second signal equal to each other, wherein:
the resonant component comprises a first capacitor connected to the inductor of the resonant circuit; and
the switching circuitry comprises a first switch connected between a first terminal of the power source and the first capacitor, a second switch connected between a second terminal of the power source and the inductor of the resonant circuit, a third switch having a first conduction terminal connected to the first capacitor and the first switch and a second conduction terminal, and a fourth switch having a first conduction terminal connected to the second conduction terminal of the third switch and a second conduction terminal coupled to the inductor of the resonant circuit and connected to the second switch.

15. A wireless power transfer system, comprising:
a resonant circuit comprising a resonant component and an inductor;
a receiver comprising an inductor which forms inductive coupling with the inductor of the resonant circuit and a rectifier connected to the inductor of the receiver, the receiver generating a DC output voltage;
an inverter having a first input coupled to a power source and a second input for receiving one or more control signals, the inverter comprising switching circuitry coupled to the first and second inputs for selectively connecting the power source to the resonant circuit; and
a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a signal that is proportional to an amount of modulation of the second signal needed to make the first signal and the second signal equal to each other, wherein
the resonant component comprises a first capacitor connected to the inductor of the resonant circuit; and
the switching circuitry comprises a first switch connected between a first terminal of the power source and the first capacitor, a second switch connected between the first terminal of the power source and the inductor of the resonant circuit, a third switch having a first conduction terminal connected to the first capacitor and the first switch and a second conduction terminal connected to a second terminal of the power source, and a fourth switch having a first conduction terminal connected to the second conduction terminal of the third switch and a second conduction terminal coupled to the inductor of the resonant circuit and connected to the second switch.

16. A wireless power transfer system, comprising:

a resonant circuit comprising a resonant component and an inductor;

a receiver comprising an inductor which forms inductive coupling with the inductor of the resonant circuit and a rectifier connected to the inductor of the receiver, the receiver generating a DC output voltage;

an inverter having a first input coupled to a power source and a second input for receiving one or more control signals, the inverter comprising switching circuitry coupled to the first and second inputs for selectively connecting the power source to the resonant circuit; and a controller receiving a first signal corresponding to an electrical parameter of the resonant component and a second signal corresponding to the electrical parameter of an input to the resonant circuit, generating the one or more control signals based upon the first signal and the second signal, the one or more control signals controlling the switching circuitry, and setting a current regulation target for the resonant circuit that is based upon a signal that is proportional to an amount of modulation of the second signal needed to make the first signal and the second signal equal to each other, wherein:

the resonant component comprises a first capacitor connected to the inductor of the resonant circuit; and the switching circuitry comprises a first switch connected between a first terminal of the power source and the first capacitor, and a third switch having a first conduction terminal connected to the first capacitor and the first switch and a second conduction terminal connected to a second terminal of the power source and coupled to the inductor of the resonant circuit.

* * * * *